(12) United States Patent
Jacobson et al.

(10) Patent No.: US 8,120,853 B2
(45) Date of Patent: Feb. 21, 2012

(54) OPTICAL ASSEMBLY, METHOD FOR ASSEMBLING AN OPTICAL ASSEMBLY, SYSTEM FOR SECURING OPTICAL ELEMENTS OF AN OPTICAL ASSEMBLY AND A SPRING FOR SECURING OPTICAL ELEMENTS OF AN OPTICAL ASSEMBLY

(75) Inventors: Alexander Jacobson, Deer Park, NY (US); Zvi Bleier, Lloyd Harbor, NY (US)

(73) Assignee: FTRX LLC, Deer Park, NY (US)

( * ) Notice: Subject to any disclaimer, the term of this patent is extended or adjusted under 35 U.S.C. 154(b) by 0 days.

(21) Appl. No.: 13/180,922

(22) Filed: Jul. 12, 2011

(65) Prior Publication Data

US 2011/0273778 A1 Nov. 10, 2011

Related U.S. Application Data

(63) Continuation of application No. 12/537,028, filed on Aug. 6, 2009, now Pat. No. 7,995,208.

(60) Provisional application No. 61/086,603, filed on Aug. 6, 2008.

(51) Int. Cl.
  *G02B 1/10* (2006.01)
  *G01B 9/02* (2006.01)
  *G01J 3/45* (2006.01)

(52) U.S. Cl. .................. 359/583; 356/450; 356/451

(58) Field of Classification Search .............. 356/450, 356/451; 359/583
See application file for complete search history.

(56) References Cited

U.S. PATENT DOCUMENTS

| | | | |
|---|---|---|---|
| 3,663,084 A | 5/1972 | Lipkins | |
| 4,556,316 A | 12/1985 | Doyle | |
| 4,710,001 A * | 12/1987 | Lacey | 359/881 |
| 4,773,757 A | 9/1988 | Doyle | |
| 4,810,092 A * | 3/1989 | Auth | 356/451 |
| 4,991,961 A * | 2/1991 | Strait | 356/452 |
| 5,002,394 A * | 3/1991 | Auth | 356/451 |
| 5,196,902 A | 3/1993 | Solomon | |
| 5,349,438 A * | 9/1994 | Solomon | 356/455 |
| 5,486,917 A * | 1/1996 | Carangelo et al. | 356/452 |
| 5,543,916 A * | 8/1996 | Kachanov | 356/451 |
| 5,808,739 A * | 9/1998 | Turner et al. | 356/519 |
| 5,949,543 A * | 9/1999 | Bleier et al. | 356/451 |
| 5,949,544 A * | 9/1999 | Manning | 356/452 |
| 6,141,101 A * | 10/2000 | Bleier et al. | 356/451 |
| 6,836,968 B1 * | 1/2005 | Walker et al. | 33/1 M |
| 6,940,598 B2 * | 9/2005 | Christel et al. | 356/417 |
| 7,116,871 B2 * | 10/2006 | Sullivan et al. | 385/52 |
| 7,268,960 B2 * | 9/2007 | Vishnia | 359/819 |
| 7,535,572 B2 * | 5/2009 | Englert | 356/451 |
| 7,630,081 B2 * | 12/2009 | Ressler et al. | 356/451 |
| 7,995,208 B2 * | 8/2011 | Jacobson et al. | 356/451 |
| 2005/0008298 A1 * | 1/2005 | Sullivan et al. | 385/52 |
| 2005/0094155 A1 * | 5/2005 | Hill et al. | 356/500 |
| 2008/0170231 A1 * | 7/2008 | Ressler et al. | 356/451 |
| 2010/0033728 A1 * | 2/2010 | Jacobson et al. | 356/451 |

* cited by examiner

*Primary Examiner* — Patrick J Connolly

(74) *Attorney, Agent, or Firm* — Gilman Pergament LLP

(57) ABSTRACT

A monolithic frame for optics used in interferometers where the material of the monolithic frame may have a substantially different coefficient of thermal expansion from the beamsplitter and compensator without warping, bending or distorting the optics. This is accomplished through providing a securing apparatus holding the optics in place while isolating the expansion thereof from the expansion of the frame. Stability in optical alignment is therefore achieved without requiring a single material or materials of essentially identical coefficients of thermal expansion. The present invention provides stability in situations where it is not possible to utilize a single material for every component of the interferometer.

40 Claims, 7 Drawing Sheets

OPTICAL ASSEMBLY, METHOD FOR ASSEMBLING AN OPTICAL ASSEMBLY, SYSTEM FOR SECURING OPTICAL ELEMENTS OF AN OPTICAL ASSEMBLY AND A SPRING FOR SECURING OPTICAL ELEMENTS OF AN OPTICAL ASSEMBLY

CROSS-REFERENCE TO RELATED APPLICATION

This application is a Continuation application of U.S. patent application Ser. No. 12/537,028, filed Aug. 6, 2009, which claims priority to U.S. Provisional Application No. 61/086,603, filed on Aug. 6, 2008, the entireties of which applications are incorporated herein by reference.

FIELD OF THE INVENTION

The present invention is in the field of monolithic interferometers. Such monolithic interferometers provide stability in optical alignment by, among other factors, using a single material. The present invention provides stability in situations where it is not possible to utilize a single material for every component of the interferometer.

BACKGROUND OF THE INVENTION

Fourier transform infrared ("FTIR") spectrometers are well known in the art. Michelson interferometers function by splitting a beam of electromagnetic radiation into two separate beams via a beam splitter. Each beam travels along its own path, e.g. a reference path of fixed length and a measurement path of variable length. A reflecting element, such as a retroreflector, is placed in the path of each beam and returns them both to the beam splitter. The beams are there recombined into a single exit beam. The variable path length causes the combined exit beam to be amplitude modulated due to interference between the fixed and variable length beams. By analyzing the output beam, the spectrum, which is the intensity of the input beam as a function of frequency, may be derived after suitable calibration.

When the above interferometer is employed in a FTIR spectrometer, the exit beam is focused upon a detector. If a sample is placed such that the modulated beam passes through it prior to impinging upon the detector, the analysis performed can determine the absorption spectrum of the sample. The sample may also be placed otherwise in the arrangement to obtain other characteristics.

Because Michelson interferometers rely upon the interference from recombination of the two beams, a quality factor of such a device is the degree to which the optical elements remain aligned. The beam splitter and mirror-supporting structures must be isolated to the greatest possible degree from extraneous forces which would tend to produce distortions of the structure. Such forces and resultant distortions introduce inaccuracies into the optical measurements. The forces may arise from vibrational effects from the environment and can be rotational or translational in nature. A similarly pervasive issue concerns distortions due to changes in the thermal environment. Needless to say, considerations of weight, size, facility of use, efficiency, manufacturing cost and feasibility are also of primary importance.

Prior art optical assemblies used in the construction of standard Michelson interferometers, and other type interferometers, have consisted primarily of structures having parts which are in need of high accuracy alignment. For example, the arrangement of the two reflecting assemblies and the beamsplitter must be highly accurate in the perpendicular and reflecting arrangements in order to avoid errors introduced due to any such misalignment. The trouble with these prior art interferometers and optical assemblies arises from the costs involved in meticulously aligning the optical elements, the necessity for active subsystems to maintain the alignment, and subsequent costs to service and readjust the interferometer if shocks and vibrations have introduced uncompensated misalignment.

U.S. Pat. Nos. 5,949,543 and 6,141,101 to Bleier and Vishnia addressed the above issues with a monolithic interferometer constructed from a single material, preferably a material having a low coefficient of thermal expansion. However, it is not always possible to utilize a monolithic interferometer made out of a single material because materials having reflectance/transmittance properties appropriate to a necessary wavelength of light may not technically or economically lend themselves to elements of the monolithic interferometer other than the optical elements.

Accordingly, it would be desirable to provide a monolithic interferometer with optical elements of a different material than the remainder of the interferometer that, nevertheless, provides high accuracy measurements. Such an interferometer would facilitate easy and cost effective maintenance by replacement of the entire optical assembly, which optical assembly is not subject to misalignment from shocks, vibrations, or temperature changes due to the monolithic structure of the assembly. It would be further desirable to provide an optical assembly which allows for use of multiple wavelength light sources to achieve a "fringe" result in a spectrometry application.

SUMMARY OF THE INVENTION

Accordingly, it is a broad object of the invention to provide an optical assembly for use with a precision instrument comprising a frame assembly having a top plate; a bottom plate; a first support member bonded between a first portion of the top plate and a first portion of the bottom plate; and a second support member bonded between a second portion of the top plate and a second portion of the bottom plate. The top plate, bottom plate and support members all formed of one of the same material or a materials having substantially the same coefficient of thermal expansion and defining a frame interior space. The frame having a beamsplitter inside the interior space; the beamsplitter extending between the top plate and bottom plate and having a first face and a second face. A mirror is attached to the frame assembly, the mirror having a reflecting surface in a reflecting relation with the beamsplitter. The beamsplitter is attached to the frame by a securing apparatus having spring arms and mounting buttons, the spring arms each having a free end and an end attached to one of either the top plate or the bottom plate and the mounting buttons each attached to one of either the top plate or bottom plate, the mounting buttons engaging the beamsplitter first face and the spring arm free end engaging the beamsplitter second face. Wherein the optical assembly is substantially stable regarding the reflective relationship between the mirror and the beamsplitter and the beamsplitter first and second face having limited exposure to bending and warping.

The optical assembly securing apparatus may comprise pressure plates attached to the beamsplitter at the point of engagement between the spring arm free end and the beamsplitter second face.

The optical assembly may also have a compensator disposed between the mirror and the beamsplitter and the compensator may have its own securing apparatus having spring arms and mounting buttons, the compensator securing spring arms each having a free end and an end attached to one of either the top plate or the bottom plate and the compensator securing buttons each attached to one of either the top plate or bottom plate, the compensator securing buttons engaging a compensator first face and the compensator securing spring arm free end engaging a compensator second face.

The spring arm attached end may comprise a cylinder and the top plate and bottom plate further comprising securing apparatus holes sized to receive the spring arm cylinder.

The optical assembly may also have a second mirror attached to the frame assembly having a reflecting surface facing away from the frame interior space.

The securing apparatus may comprise a three-point mounting having two sets of buttons and springs on one of the top plate or bottom plate and one button and spring set on the other of the top plate or bottom plate.

In an alternative embodiment of the present invention, an interferometer is disclosed comprising a radiation source and a monolithic frame comprising a top plate and a bottom plate rigidly held in relation to one another by a first support member bonded to the top plate and the bottom plate and a second support member bonded to the top plate and the bottom plate, the plates and supports of the frame being of the same material and defining an interior space. A beamsplitter extends between the top plate and the bottom plate. A first mirror is attached to the frame assembly and has a reflecting surface in a first direct reflecting relation with the beamsplitter. A second mirror is attached to the frame assembly and has a reflecting surface in a second direct reflecting relation with a retroreflector. The retroreflector is external to the interior space, moveable relative to the frame and has a retroreflection relation with both the beamsplitter and the second mirror. The beamsplitter is attached to the frame by a beamsplitter securing apparatus having spring arms and mounting buttons, the spring arms each having a free end and an end attached to one of either the top plate or the bottom plate and the mounting buttons each attached to one of either the top plate or bottom plate. The mounting buttons engage a beamsplitter first face and the spring arm free ends engage a beamsplitter second face. Wherein the optical assembly is substantially stable regarding the reflective relationships and the beamsplitter first and second face having limited exposure to bending and warping. The described interferometer may have the same optional components as the optical assembly described above.

DETAILED DESCRIPTION OF THE INVENTION

Figure 1:
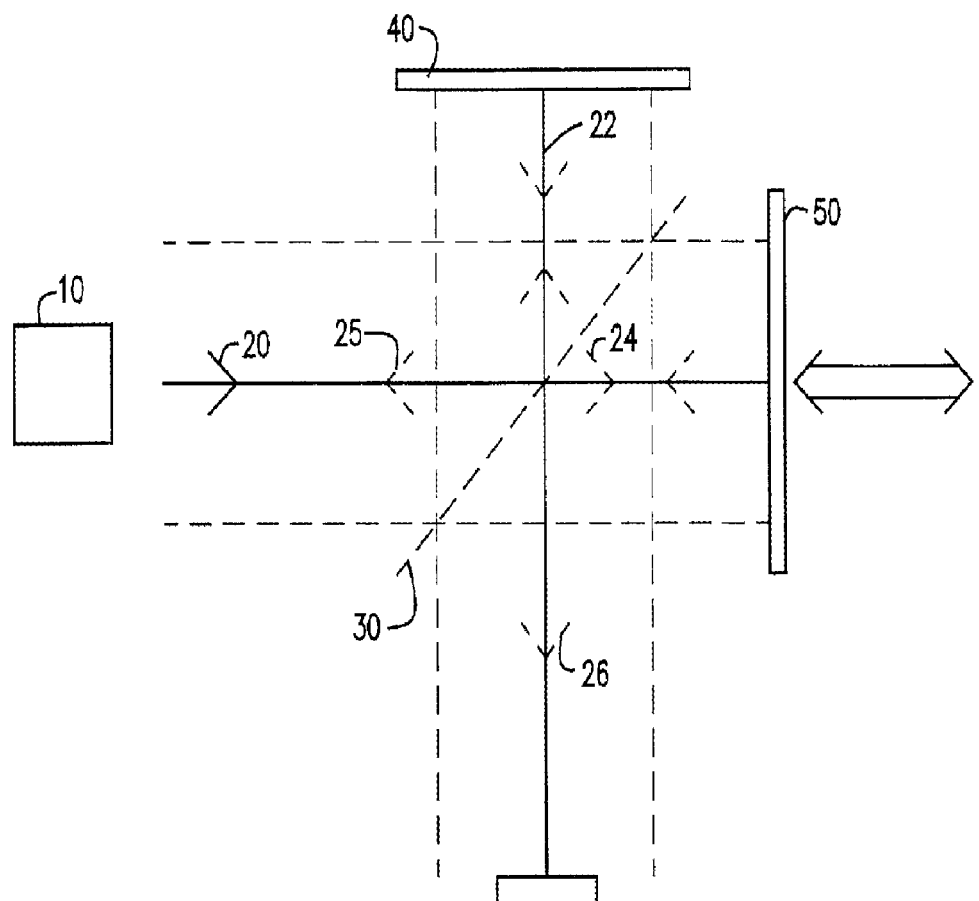
FIG. 1 is a diagram showing how radiation is reflected in a prior art Michelson interferometer.

Referring to FIG. 1, the general principals of a standard Michelson interferometer are shown. The Michelson interferometer has a radiation source 10 which sends a single radiation beam 20 towards beamsplitter 30 which is situated at an angle to two mirrors, a fixed mirror 40 and a movable mirror 50. Radiation beam 20 is partially reflected toward fixed mirror 40 in the form of radiation beam 22, and is partially transmitted through beamsplitter 30 towards movable mirror 50 as radiation beam 24. Beam 22 is then reflected off of fixed mirror 40, back towards beamsplitter 30, where it is once again partially split, sending some radiation 25 back towards source 10, and some radiation 26 toward detector 60. Similarly, beam 24 reflects off of movable mirror 50 and is reflected back toward beamsplitter 30. Here also, beam 24 is again split, sending some radiation back to source 10 and other radiation 26 toward detector 60.

Detector 60 measures the interference between the two radiation beams emanating from the single radiation source. These beams have, by design, traveled different distances (optical path lengths), which creates a fringe effect which is measurable by detector 60.

Figure 2:
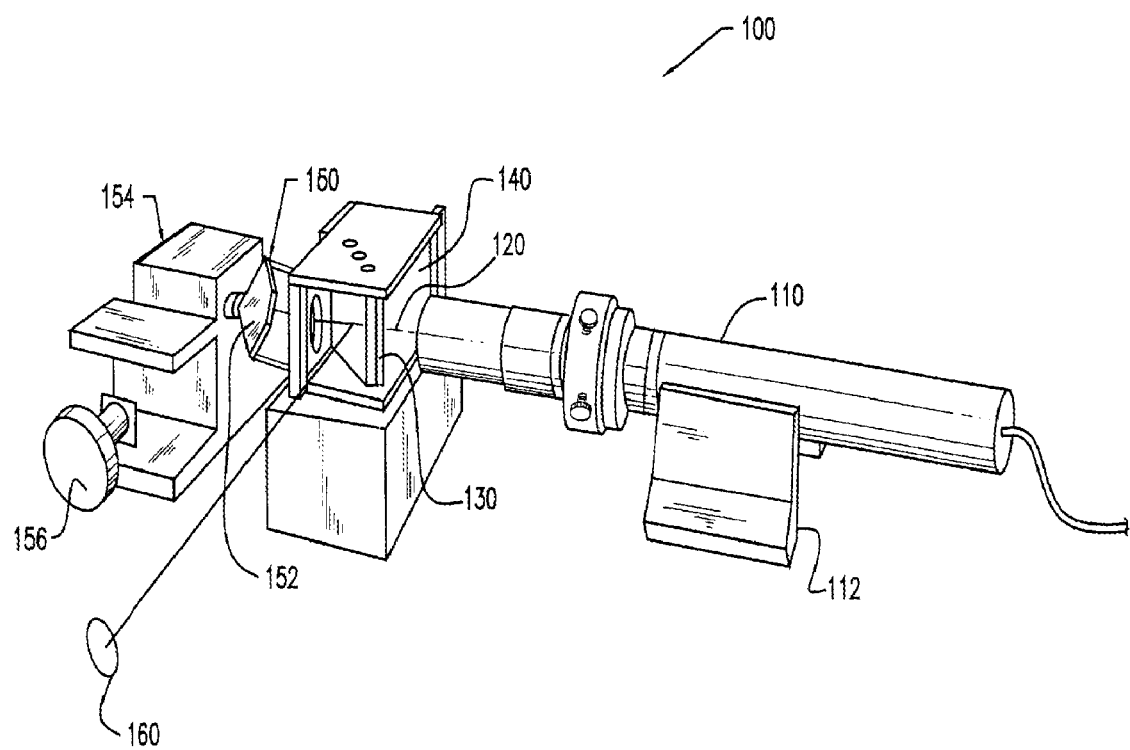
FIG. 2 is a perspective view of an interferometer having the monolithic optical assembly of the invention.

FIG. 2 shows the lay out and component structure of a Michelson interferometer of the prior art, e.g. U.S. Pat. No. 6,141,101 to Bleier, herein incorporated by reference. FIG. 2 shows interferometer 100, and includes a radiation source 110, a beamsplitter 130, a movable reflecting assembly 150, a fixed reflecting assembly 140 and a detector 142. Radiation source 110 is mounted in a secure position by mounting assembly 112. With radiation source 110 in mounting assembly 112, radiation beam 120 is alignable along a path which will fix the direction of the beam at the appropriate angle to beamsplitter 130.

Radiation source 110 can be collimated white light for general interferometry applications, such as optical surface profiling, or even a single collimated radiation intensity laser light source, for accurate distance measurements.

Movable reflecting assembly 150 may utilize a hollow corner-cube retroreflector 152. The hollow corner-cube retroreflector 152 could be made in accordance with the disclosure of U.S. Pat. No. 3,663,084 to Lipkins, herein incorporated by reference.

Retroreflector 152 is mounted to a movable base assembly 154, which assembly allows for adjustment of the location of retroreflector 152 in a line along the path of beam 120. The displacement of assembly 154 is adjustable; e.g., through use of adjusting knob 146. Other means of moving assembly 154 are also anticipated by the invention, including such means that might allow for continuous, uniform movement of assembly 154. For example, movement of assembly 154 might be accomplished in accordance with the structure described in U.S. Pat. No. 5,335,111 to Bleier, herein incorporated by reference, or by co-pending application Ser. No. 12/505,279 filed on Jul. 17, 2009.

The use of retroreflector 152 as movable reflecting assembly 150 allows for any angular orientation of retroreflector 152 as long as edge portions of the retroreflector mirrors do not clip a portion of beam 120.

From the foregoing, the length of the light paths 20, 22 and 26 are fixed and known while the length of light path 24 may be varied. The variation of the length of light path 26 is, of course, critical to the operation of the interferometer, as is knowing the length as precisely as possible.

Figure 3:
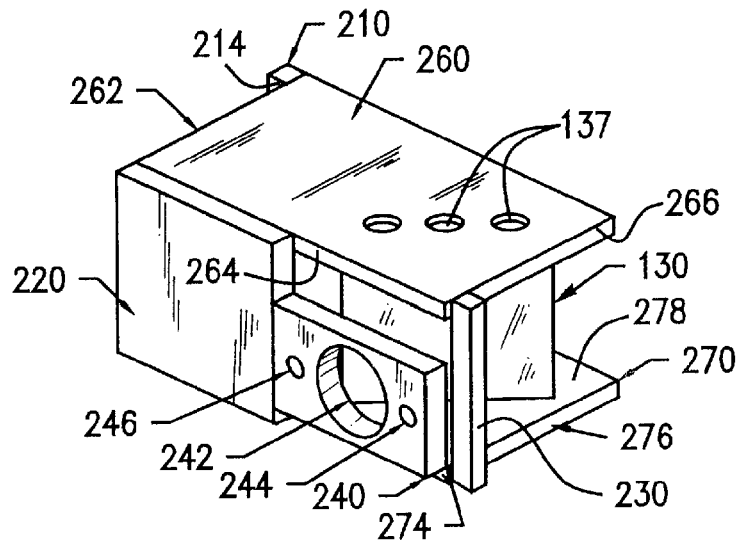
FIG. 3 is a perspective view of a monolithic optical assembly of the prior art.

A monolithic optical assembly 200, as seen in FIG. 3, comprises a beamsplitter 130 and reflecting assembly 140 mounted within a top plate 260, a bottom plate 270 and at least first and second support members 210 and 220, respectively. As an add-on for some additional structural stability, which stability is not essential, third support member 230 can also be used. Support member 210 has an edge 214. A portion of edge 214 is bonded to a portion of edge 262 of top plate 260, while another portion of edge 214 of support member 210 is bonded to a portion of an edge surface of bottom plate 270.

Figure 4:
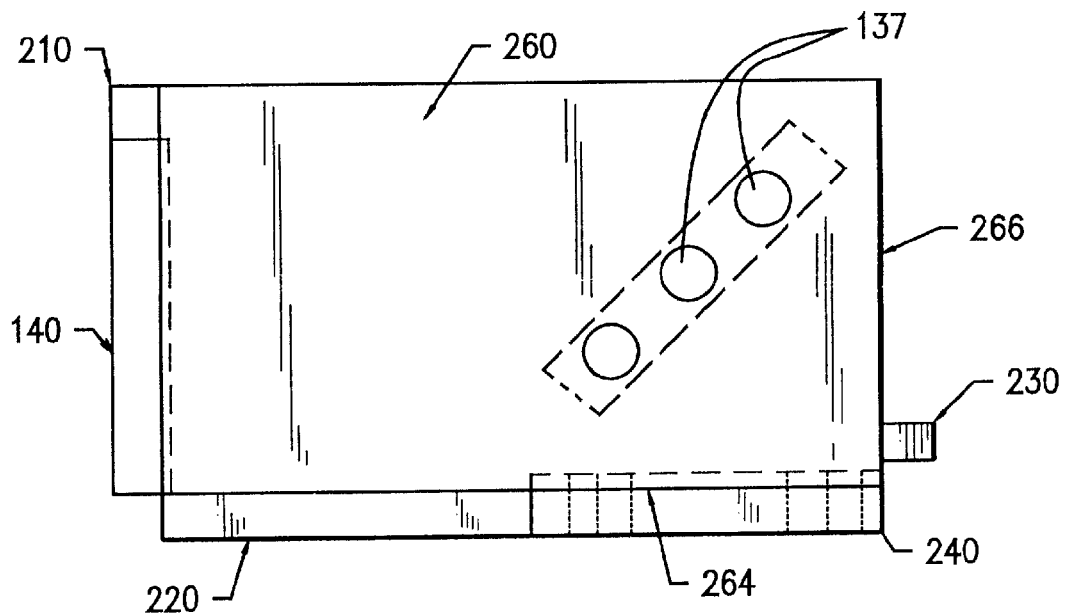
FIG. 4 is a top view of a monolithic optical assembly of the prior art.

Continuing with FIG. 4, around the corner from support member 210, is second support member 220. Second support member 220 is bonded to top and bottom plates 260 and 270 along different portions of a surface 222 thereof. The portions of surface 222 of support member 220 are bonded to portions of an edge surface 264 of top plate 260 and edge surface 274 of bottom plate 270.

Beamsplitter 130 may comprise of two panels bonded to each other along a common surface. The common surface is an optically flat reflecting surface having a beamsplitter coating thereon. Beamsplitter 130 is bonded along portions of top edges 137 to portions of bottom surface 267 of top plate 260, and along portions of bottom edges 138 to portions of top surface 278 of bottom plate 270. One panel of beamsplitter 130 is a compensating member. 40 The purpose of the compensating panel is to equate the material portions of the optical path difference of the two beams created by the beamsplitter. Without the compensating panel, the beam transmitted through the beamsplitter would travel through the optical material of the beamsplitter twice, while the reflected beam would travel through optical material zero times. By adding a compensating panel, ideally of the same thickness, wedge, and material as the beamsplitter, both beams travel twice through equal portions of optical material before being recombined at the beamsplitter surface, thereby equating any differences they may have experienced in that portion of their optical path length through material.

The support combination of first support member 210, second support member 220 and beamsplitter 130 between top plate 260 and bottom plate 270 creates a monolithic structure. As early discussed, it is also possible to have third support member 230 situated between portions of third edge surfaces 266 and 276 of top and bottom plates 260 and 270, respectively, as seen in the figures To complete the required reflecting elements of a Michelson interferometer, it is seen in the figures that a mirror panel 140 is bonded to a portion of top surface 278 of bottom plate 270, and to a second edge surface 214 of support member 210. Mirror panel 140 is slightly over hanging top surface 278 of bottom plate 270 by a portion of a bottom edge surface of mirror panel 140, and is bonded between these touching surfaces. Bonding also takes effect between the side edge surface of mirror panel 140 that touches edge surface 214 of support member 210. Bonding must avoid distorting the optically flat nature of the reflecting surface 142 of mirror panel 140.

Since mirror panel 140 is fixedly attached to assembly 200, as has just been discussed, there is no necessity for panel 140 to be other than a single, flat paneled mirror; for example, panel 140 does not need to be a retroreflector. One of the benefits of using a retroreflector (as has been discussed earlier regarding movable reflecting assembly 150) in a structure is that the orientation of the retroreflector is unimportant. In the subject invention, the secured mounting of panel 140 to the monolithic structure assures that the orientation of panel 140 will not fluctuate due to vibration and shock, and therefore, a retroreflector is unnecessary (although a retroreflector could of course be utilized).

The portion of beam 120 that passes through beam splitter 130 and interacts with retroreflector 152 may also be returned via a second mirror panel, similar to mirror panel 140. This second mirror panel may be made integral with second support member 220 or be a separate panel supported by one or all of the second support member 220, edge 264 of top plate 260 and bottom plate 270.

Assembly 200 can also have a fourth support member 240. While the main purpose of fourth support member 240 is not to help stabilize the monolithic structure of assembly 200, it is nevertheless called a support member herein. Instead, fourth support member 240 is positioned in relation to the path traveled by beam 120 so as to allow beam 120 to pass through opening 242 in member 240, to travel between beamsplitter 130 and movable reflecting assembly 150. One or both of elements 244, 246 can comprise reflecting elements for returning beam 120 to retroreflector 252.

All members 210, 220, 230, 240, 260, 270, 130 and 140, of assembly 200, may be made of the same material. The material preferably being fused quartz or annealed Pyrex. The use of identical materials allows the coefficients of expansion of the materials to be identical, so that any temperature changes experienced by assembly 200 is experienced equally throughout each member to allow assembly 200 to expand and contract uniformly, thereby removing the possibility of distortions in the reflecting surfaces of beamsplitter 130 and mirror panel 140.

The monolithic construction discussed above has the benefit of high thermal stability in its optical alignment. This stability derives from the construction of the unit from a single, low expansion material such as Pyrex glass, fused silica, Zerodur or Cervit. However, in the application of infrared Fourier transform spectroscopy, often called FTIR, it may not be possible to fabricate the beamsplitter and compensating plate from the same material as the assembly. This may occur when the need for high transmission in the infrared ("IR") is not consistent with available low expansion structural materials. In particular, the high IR transmission optical material may have a much higher thermal expansion coefficient.

Attaching optical elements having a thermal expansion coefficient different from the expansion coefficient of the remainder of the assembly could introduce wavefront distortion in the interfering optical beams or even result in mechanical failure under temperature changes. In order to take advantage of the permanent optical alignment afforded by a monolithic assembly, the connection between optical elements, e.g. beamsplitter and compensating plate, and the rest of the monolithic assembly should transmit minimal stress from this assembly to the optical elements under temperature changes.

Figure 5:
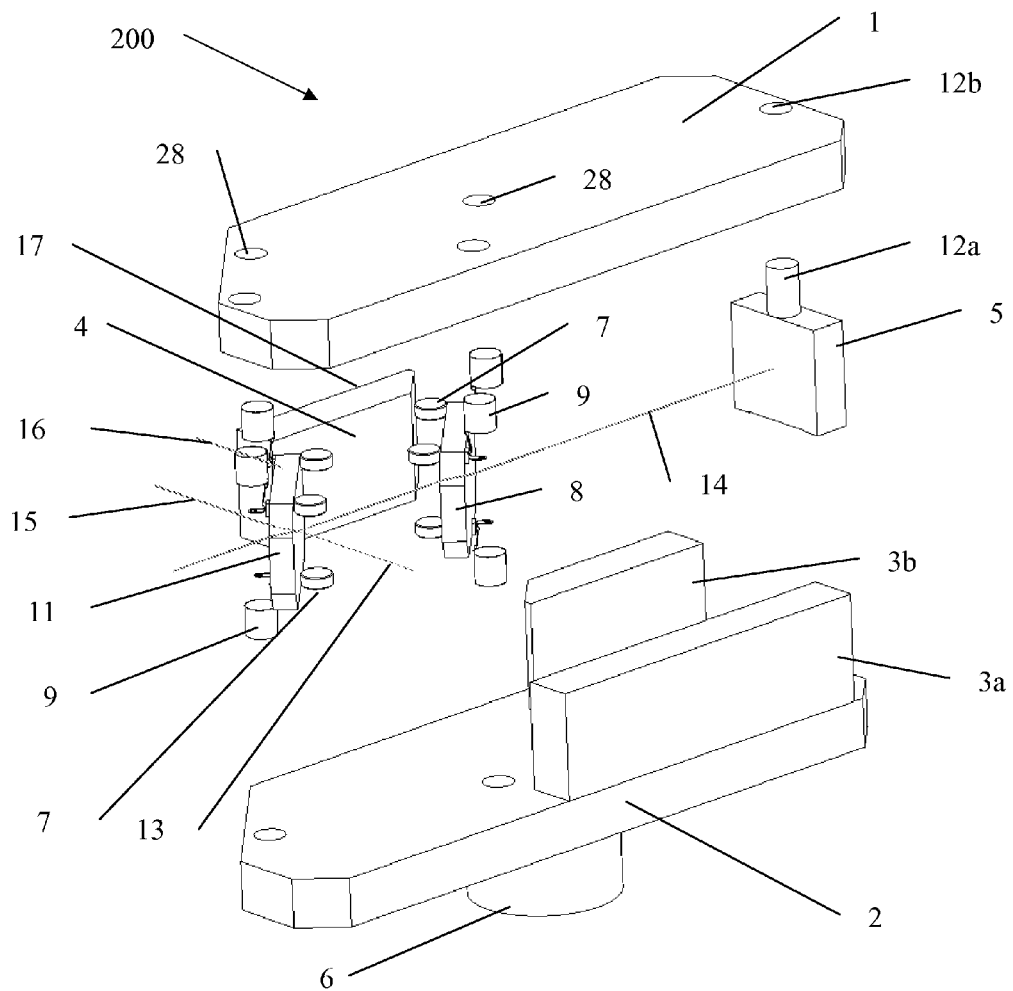
FIG. 5 is a perspective exploded view of the optical assembly of the present invention.
Figure 6:
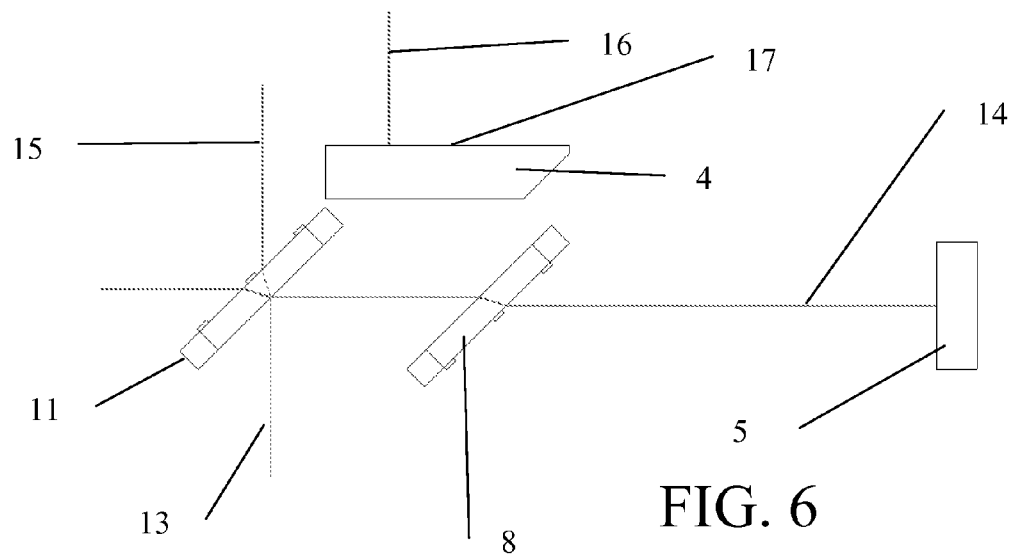
FIG. 6 is a top view of the optical assembly of FIG. 5 with all non-optical elements removed.

FIG. 5 shows an improved monolithic interferometer 200. The basic monolithic assembly is formed top plate 1, bottom plate 2, first support member 3a, second support member 3b and third support member 4. The outward facing surface 17 of third support member 4 serves as a mirror, reflecting beam 16 from retroreflector 152 and returning beam 16 to retroreflector 152. Mirror 5 is inwardly facing and has a mirror post 12a which is bonded to top plate 1 at post hole 12b. Mounting post 6 allows the monolithic interferometer 200 to be attached to the interferometer assembly 100 of which it is part.

In a two-beam interferometer, two beams are created from a single incident ray 13 striking beamsplitter 11. The two beams are the reflected beam 14 and the transmitted beam 15. Beam 14 is reflected by beamsplitter 11 towards mirror 5. Beam 14 passes through compensator plate 8 on the way to mirror 5 and returning to beamsplitter 11. In a well aligned interferometer, beam 14 is exactly perpendicular to fixed mirror 5. The transmitted beam 15, after exiting beamsplitter 11, proceeds to retroreflector 152 which reflects beam 16 back toward mirror 17 on third support member 4. In a well aligned interferometer, beam 15 is exactly parallel to beam 16, which is perpendicular to mirror 17. FIG. 2 is a plan view showing only the optical elements, less retroreflector 152, and beams of the present invention.

It is the aim of the monolithic interferometer that once alignment is achieved during assembly, final assembly permanently and rigidly locks this alignment into the structure.

Beamsplitter 11 and compensator 8 must be of material transmissive to the light being processed by the interferometer, often IR light. It must also be wedged to prevent interference effects from the front and back surfaces from creating ghost beams that can interfere with the main beams in the application. Compensator 8 is made of the same material as beamsplitter 11 with substantially and ideally the same thickness and wedge angle to compensate the optical path 13-14 with the optical path 15-16. Obviously, any means of improved mounting of beamsplitter 11 must be repeated for compensator 8.

Figure 7:
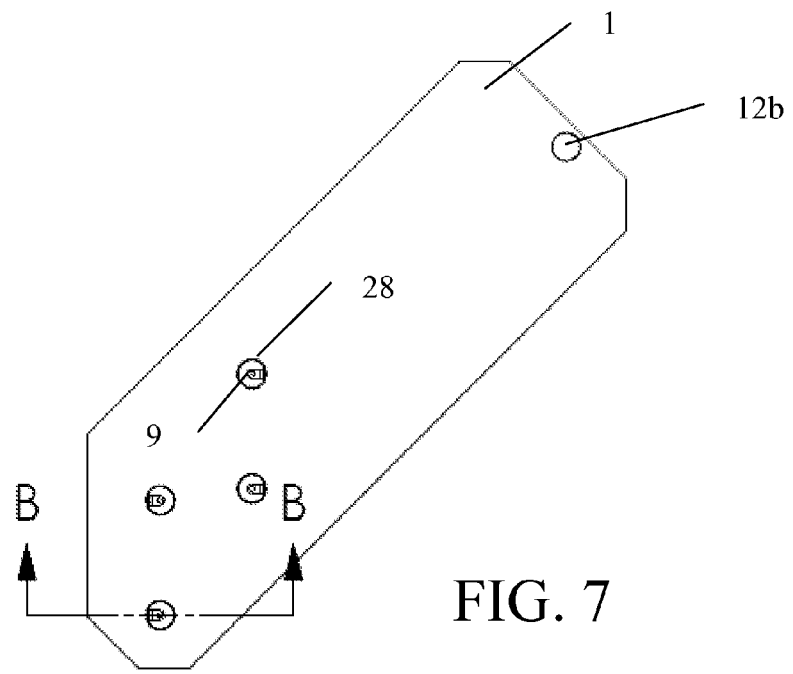
FIG. 7 is a top view of the optical assembly of FIG. 5.
Figure 7B:
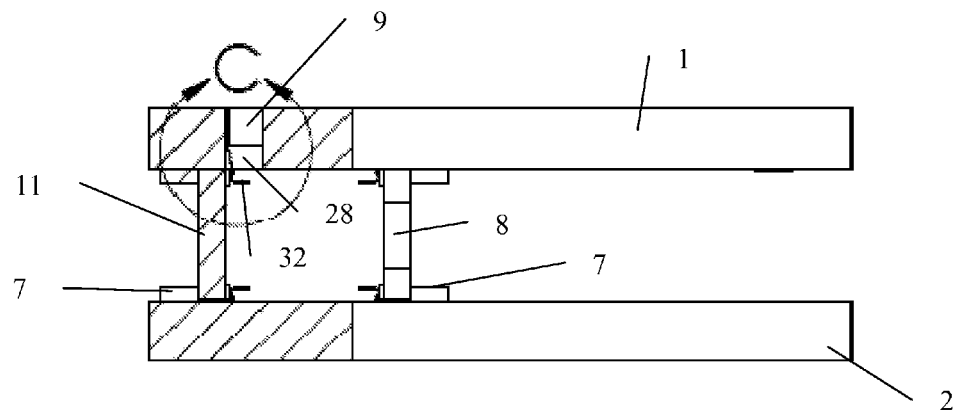
FIG. 7B is a side sectional view of the assembly of FIG. 5, the section taken along line B-B of FIG. 7.
Figure 7C:
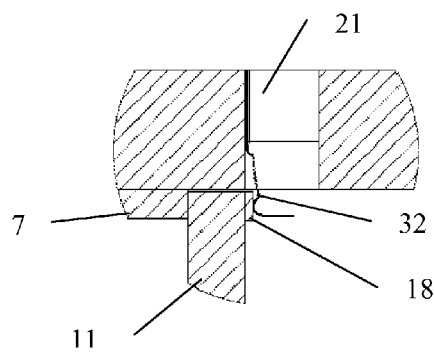
FIG. 7C is a detail sectional view at circle C-C of FIG. 7.

Springs 9, mounting buttons 7 and pressure plates 18 are used to mount beamsplitter 11 and compensator 8 in monolithic assembly 200. FIGS. 7, 7B and 7C show details of the assembly 200. Section B-B is taken along a direction perpendicular to the vertical edges of beamsplitter 11 and compensator 8. Top plate 1 is in cross-section to illustrate insertion of spring body 21 into spring hole 28. Spring arm 32 presses against pressure plate 18 attached to the beamsplitter 11 and compensator 8. This pressure exerted on beamsplitter 11 and compensator 8 through pressure plates 18 urges beamsplitter 11 and compensator 8 against mounting buttons 7. A total of three buttons 7, springs 9, and pressure plates 10 are used to achieve 3-point mounting of the beamsplitter 11 and compensator 8.

Figure 8:
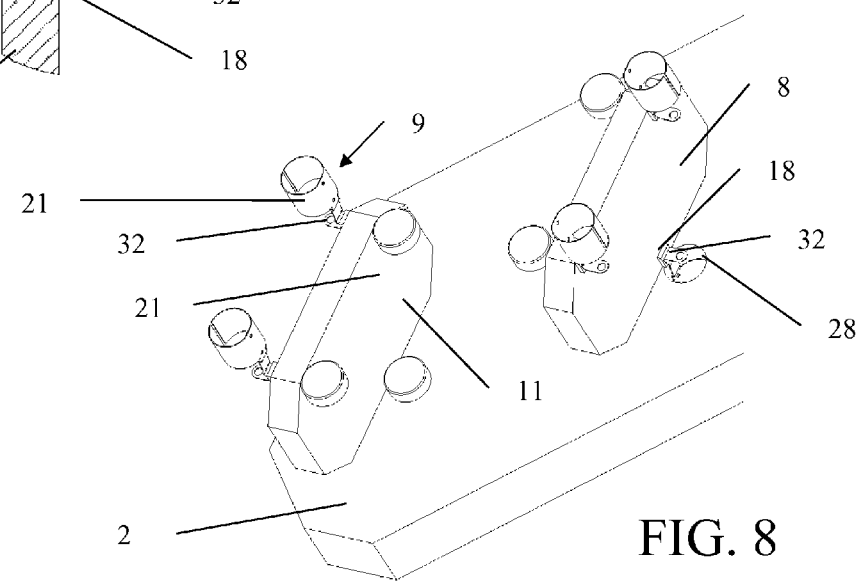
FIG. 8 is a perspective detail of a portion of the optical assembly of FIG. 5 with the top plate removed to show interior details.
Figure 9:
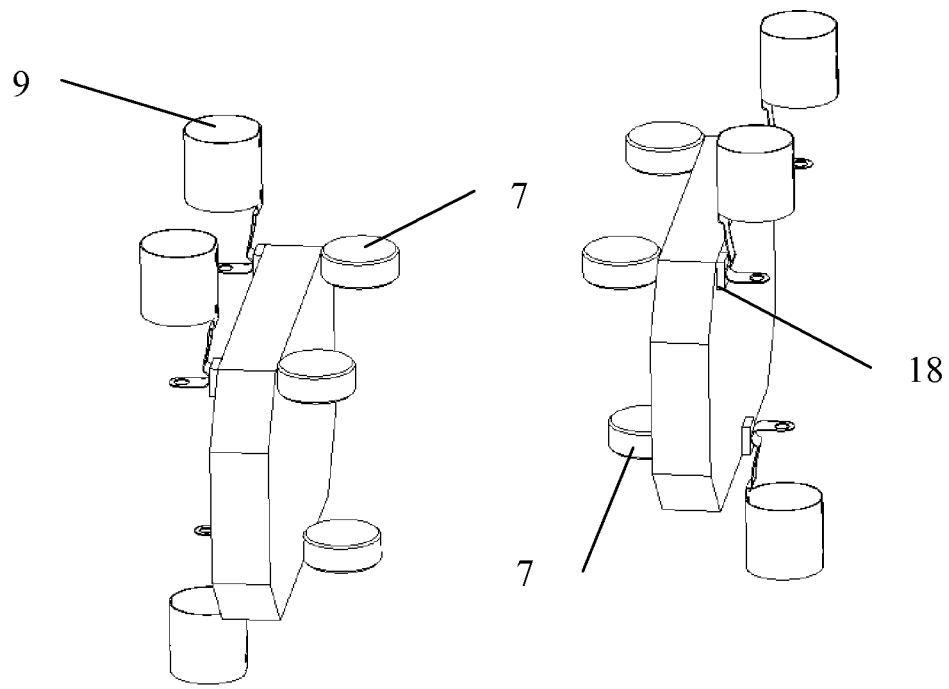
FIG. 9 is a perspective view of the optical assembly of FIG. 5 with all elements removed other than the beamsplitter 11, compensator 8 and their associated securing apparatus.

Each spring body 21 may be bonded in hole 28. This arrangement is further shown in perspective in FIG. 8. FIG. 9 shows further detail of the mounting scheme, in a perspective view with assembly members not shown. In this embodiment, two spring-pad-button arrangements per optical element are utilized in engaging the top plate 1 and one spring-pad-button arrangement is utilized per optical element in engaging the bottom plate 2. The outside surface of the spring body 21 is bonded to the inner surface of the hole 28.

Pressure pads 10 are bonded to beamsplitter 11 and compensator 8. The pressure pads prevent damage of optical element surfaces by spring arm 32. Alternatively pads 7 may be fused directly to those members.

Fixturing must be done to assure that the planes formed by the contacting cylindrical surfaces of buttons 7 are properly oriented before the monolithic assembly is fixed, to facilitate the alignment of the interferometer. Once fixturing is accomplished, all buttons 7 and spring arms 32 may be bonded to the respective beamsplitter 11 or compensator 8. When beamsplitter 11 and compensator 8 expand, they will expand only laterally. This preserves their optical surfaces against bending and warping. The bonding method used must be sufficiently flexible so as to not interfere with this slight expansion, yet strong enough to guarantee resistance of the assembly to shocks.

Figure 10:
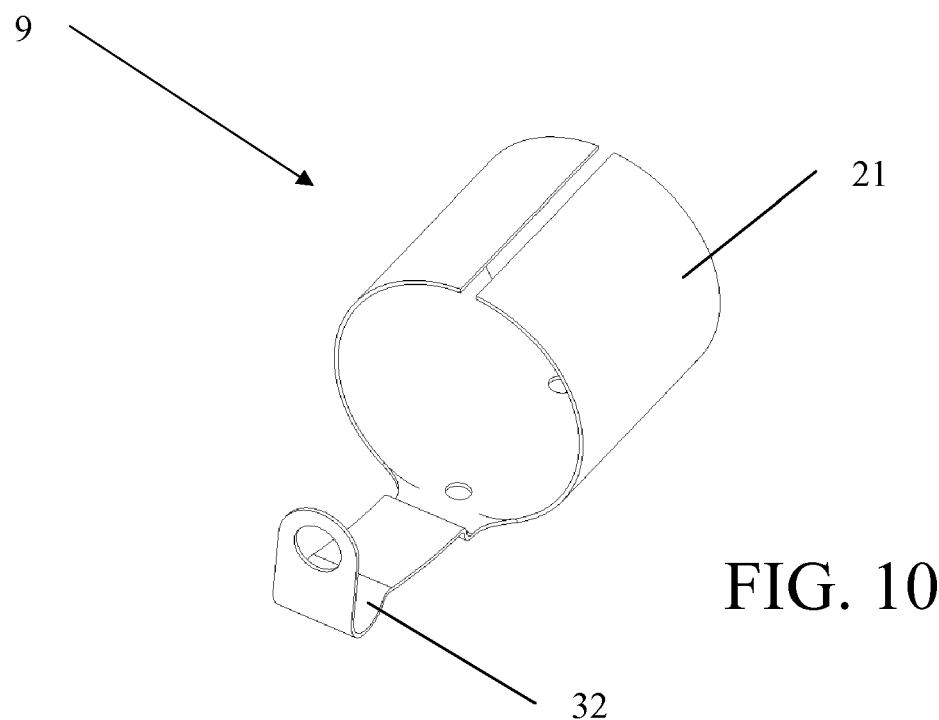
FIG. 10 is a perspective view of spring 9.

FIG. 10 shows a detailed view of the springs 9. Body 21 is formed with diameter slightly larger than the holes 28. This facilitates the frictional holding of these springs in holes 28. Gap 23 facilitates the insertion of the springs 9 into their respective holes 28. Holes 36 permit oozing of liquid bonding material into the interior area of the spring during curing. The liquid bonding material will tend to form plugs in holes 24, helping to resist the rotation of the assembly. Hole 35 on the end of the spring arm 32 aids in assembly, by permitting the assembler to grab and pull back the flex arm using a hook or other tool temporarily inserted into this hole. In this manner, the flex arm 32 may be retracted to clear the beamsplitter 11 or compensator 8 while it is being installed.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may achieve numerous modifications thereto and changes may be made without departing from the scope and spirit of the invention in its aspects.

What is claimed is:

1. An optical assembly for use with a precision instrument, comprising:
   a beamsplitter having a first face and a second face;
   a frame assembly comprising:
      a top plate and a bottom plate having the beamsplitter extending therebetween; and
   a beamsplitter securing apparatus having one or more spring arms and one or more mounting buttons, the one or more spring arms each having a free end engaging the second face of the beamsplitter and an end attached to one of either the top plate or the bottom plate, the one or more mounting buttons each attached to one of either the top plate or the bottom plate and the one or more mounting buttons engaging the beamsplitter first face.

2. The optical assembly of claim 1, wherein at least one of the first face and the second face of the beamsplitter has limited or no exposure to bending and warping.

3. The optical assembly of claim 1, further comprising:
   a first support member bonded between a first portion of the top plate and a first portion of the bottom plate; and
   a second support member bonded between a second portion of the top plate and a second portion of the bottom plate.

4. The optical assembly of claim 3, wherein one or more materials of the top plate, the bottom plate, the first support member and the second support member each comprise at least one of the same material or materials having substantially the same coefficient of thermal expansion.

5. The optical assembly of claim 4, further comprising a mirror attached to the frame assembly, the mirror having a reflecting surface in a reflecting relation with the beamsplitter, wherein the optical assembly is substantially stable regarding the reflective relationship between the mirror and the beamsplitter.

6. The optical assembly of claim 5, further comprising:
a compensator disposed between the mirror and the beamsplitter, the compensator having a first face and a second face; and
a compensator securing apparatus having one or more spring arms and one or more mounting buttons, the one or more spring arms of the compensator securing apparatus each having a free end engaging the second face of the compensator and an end attached to one of either the top plate or the bottom plate, the one or more mounting buttons of the compensator securing apparatus each attached to one of either the top plate or the bottom plate and the one or more mounting buttons of the compensator securing apparatus engaging the first face of the compensator, wherein
at least one of the first face and the second face of the compensator has limited or no exposure to bending and warping.

7. The optical assembly of claim 6, wherein:
the attached end of at least one of the one or more spring arms of at least one of the beamsplitter securing apparatus and the compensator securing apparatus comprises a cylindrical member; and
the top plate and the bottom plate further comprise one or more securing apparatus holes sized and shaped to receive the cylindrical member of the attached end of the at least one of the one or more spring arms of at least one of the beamsplitter securing apparatus and the compensator securing apparatus.

8. The optical assembly of claim 7, wherein the cylindrical member of at least one of the beamsplitter securing apparatus and the compensator securing apparatus further comprises a gap, the gap operating to permit the cylindrical member to compress and be inserted into the one or more securing apparatus holes and to be held in the one or more securing apparatus holes by friction.

9. The optical assembly of claim 8, wherein at least one of the beamsplitter securing apparatus and the compensator securing apparatus further comprises pressure plates attached to the respective beamsplitter or compensator at the point of engagement between the free end of the one or more spring arms and the second face of the beamsplitter or compensator.

10. The optical assembly of claim 8, further comprising a second mirror attached to the frame assembly, the second mirror having a reflecting surface facing away from an interior space of the frame assembly, the second mirror being in reflecting relation to the beamsplitter through a retroreflector.

11. The optical assembly of claim 8, wherein at least one of the beamsplitter securing apparatus and the compensator securing apparatus comprises a three-point mounting having two sets of the one or more mounting buttons and the one or more springs arms on one of the top plate or the bottom plate and one set of the one or more mounting buttons and the one or more spring arms on the other of the top plate or the bottom plate.

12. The optical assembly of claim 1, wherein at least one of:
the beamsplitter securing apparatus further comprises one or more pressure plates attached to the beamsplitter at the point of engagement between the free end of the one or more spring arms and the second face of the beamsplitter; and
the beamsplitter securing apparatus comprises a three-point mounting having two sets of the one or more mounting buttons and the one or more spring arms on one of the top plate or the bottom plate and one set of the one or more mounting buttons and the one or more spring arms on the other of the top plate or the bottom plate.

13. A method of assembling an optical assembly, comprising the steps of:
disposing a beamsplitter having a first face and a second face in between a top plate and a bottom plate such that the beamsplitter extends between the top plate and the bottom plate;
attaching one or more mounting buttons to one of either the top plate or the bottom plate such that the one or more mounting buttons each engage the first face of the beamsplitter; and
attaching a first end of each of one or more spring arms to the one of either the top plate or the bottom plate that the one or more mounting buttons is attached such that a second end of each of the one or more spring arms engages the second face of the beamsplitter and secures the beamsplitter between the one or more mounting buttons and the one or more spring arms.

14. The method of claim 13, wherein:
the attaching of the one or more mounting buttons step further comprises attaching a first mounting button and a second mounting button of the one or more mounting buttons on one of the top plate or the bottom plate and attaching a third mounting button of the one or more mounting buttons on the other of the top plate or the bottom plate; and
the attaching of the first end of each of the one or more spring arms step further comprises attaching a first end of a first spring arm and a first end of a second spring arm of the one or more spring arms on the one of the top plate or the bottom plate and attaching a first end of a third spring arm of the one or more spring arms on the other of the top plate or the bottom plate such that the beamsplitter is securely mounted in three points of engagement located between the first mounting button and the second end of the corresponding first spring arm, the second mounting button and the second end of the corresponding second spring arm and the third mounting button and the second end of the corresponding third spring arm.

15. The method of claim 14, further comprising:
disposing a compensator having a first face and a second face in between the top plate and the bottom plate such that the compensator extends between the top plate and the bottom plate, wherein the compensator is aligned with, and/or substantially parallel to, the beamsplitter;
attaching one or more other mounting buttons to one of either the top plate or the bottom plate such that the one or more other mounting buttons each engage the first face of the compensator; and
attaching a first end of each of one or more other spring arms to the one of either the top plate or the bottom plate that the one or more other mounting buttons is attached such that a second end of each of the one or more other spring arms engages the second face of the compensator and secures the compensator between the one or more other mounting buttons and the corresponding one or more other spring arms.

16. The method of claim 15, wherein:
the attaching of the one or more other mounting buttons step further comprises attaching a first other mounting button and a second other mounting button of the one or more other mounting buttons on one of the top plate or the bottom plate and attaching a third other mounting button of the one or more other mounting buttons on the other of the top plate or the bottom plate; and the attaching of the first end of each of one or more other spring arms step further comprises attaching a first end of a first other spring arm and a first end of a second other spring arm of the one or more other spring arms on the one of the top plate or the bottom plate and attaching a first end of a third other spring arm of the one or more other spring arms on the other of the top plate or the bottom plate such that the compensator is securely mounted in three points of engagement located between the first other mounting button and the second end of the corresponding first other spring arm, the second other mounting button and the second end of the corresponding second other spring arm and the third other mounting button and the second end of the corresponding third other spring arm.

17. The method of claim 16, further comprising at least one of:
retracting the one or more spring arms and the one or more other spring arms to at least one of insert and remove at least one of the beamsplitter and the compensator between the top plate and the bottom plate; and
attaching one or more pressure plates to at least one of the beamsplitter and the compensator at the points of engagement between the second end of each of the one or more spring arms and the second face of the beamsplitter and at the points of engagement between the second end of each of the one or more other spring arms and the second face of the compensator.

18. The method of claim 16, wherein:
the attached first end of each of the one or more spring arms and the attached first end of each of the one or more other spring arms comprise a cylindrical member having a gap that operates to permit the cylindrical member to compress; and
the top plate and the bottom plate further include one or more securing holes that are sized and shaped to receive the corresponding compressed cylindrical member of the attached first end of each of the one or more spring arms and the attached first end of each of the one or more other spring arms.

19. The method of claim 18, further comprising:
compressing the cylindrical member of the attached first end of each of the one or more spring arms and the attached first end of each of the one or more other spring arms; and
inserting the cylindrical member of the attached first end of each of the one or more spring arms and the attached first end of each of the one or more other spring arms into the corresponding one or more securing holes such that the cylindrical members of the one or more spring arms and the cylindrical members of the one or more other spring arms are held in each of their corresponding securing holes by friction.

20. The method of claim 19, further comprising placing adhesive in the one or more securing holes such that the adhesive bonds the cylindrical members of the one or more spring arms and the cylindrical members of the one or more other spring arms, thereby resisting and/or preventing the rotation of the spring arms and the other spring arms within the assembly.

21. The method of claim 19, further comprising attaching one or more pressure plates to at least one of the beamsplitter and the compensator at the points of engagement between the second end of each of the one or more spring arms and the second face of the beamsplitter and at the points of engagement between the second end of each of the one or more other spring arms and the second face of the compensator.

22. The method of claim 21, further comprising:
bonding a first support member between a first portion of the top plate and a first portion of the bottom plate; and
bonding a second support member between a second portion of the top plate and a second portion of the bottom plate.

23. The method of claim 22, wherein the one or more materials of the top plate, bottom plate, the first support member and the second support member each comprise at least one of the same material or materials having substantially the same coefficient of thermal expansion.

24. The method of claim 23, further comprising at least one of:
attaching a mirror to at least one of the top plate, the bottom plate, the first support member and the second support member such that the mirror has a reflecting surface in a reflecting relation with the beamsplitter, wherein the optical assembly is substantially stable regarding the reflective relationship between the mirror and the beamsplitter;
attaching a second mirror to at least one of the top plate, the bottom plate, the first support member and the second support member such that the second mirror has a reflecting surface facing away from an interior space between the top plate, the bottom plate, the first support member and the second support member, wherein the second mirror is in reflecting relation to the beamsplitter through a retroreflector; and
aligning one or more of the top plate, the bottom plate, the first support member, the second support member, the mirror, the second mirror, the beamsplitter, the compensator, the one or more mounting buttons and the one or more spring arms before locking the alignment in place with at least one of friction, fusing and bonding.

25. A system for securing one or more optical elements of an optical assembly, comprising:
at least one spring arm having a first end and a second end, the first end operating to engage a first face of at least one optical element of an optical assembly and the second end operating to attach to one of either a top plate or a bottom plate of the optical assembly; and
at least one mounting button that operates to attach to the one of either the top plate or the bottom plate and the mounting button operating to engage a second face of the at least one optical element of the optical assembly.

26. The system of claim 25, further comprising a three-point mounting arrangement having two sets of the at least one mounting button and the at least one spring arm on one of the top plate or the bottom plate and one set of the at least one mounting button and the at least one spring arm on the other of the top plate or the bottom plate such that one or more optical surfaces of the at least one optical element are preserved against, or unaffected by, at least one of bending and warping.

27. The system of claim 25, wherein:
the at least one optical element is at least one of: a beamsplitter and a compensator plate; and
the at least one optical element extends between the top plate and the bottom plate.

28. The system of claim 27, wherein the second end of the at least one spring arm further comprises a cylindrical member, the cylindrical member operating to be inserted into, and releasably attached to, one or more securing holes formed within at least one of the top plate and the bottom plate.

29. The system of claim 28, wherein the cylindrical member further comprises a gap extending along a length of the cylindrical member, the gap operating to permit the cylindrical member to compress, thereby reducing a diameter of the cylindrical member, and be inserted into and held in the one or more securing holes by at least one of friction, fusing, and bonding via adhesive.

30. The system of claim 29, wherein the cylindrical member includes at least one hole extending from an exterior surface of the cylindrical member to an interior surface of the cylindrical member, the at least one hole operating to permit oozing of the adhesive into an interior area of the cylindrical member during curing of the adhesive when bonding or fusing the cylindrical member to the one or more securing holes.

31. The system of claim 29, further comprising one or more pressure plates that operate to attach to the at least one optical element at a point of engagement between the first end of the spring arm and the first face of the at least one optical element such that the one or more pressure plates prevent damage to the first face of the at least one optical element from the first end of the spring arm.

32. The system of claim 31, wherein the one or more pressure plates comprise at least one harder material than the at least one optical element.

33. The system of claim 31, further comprising a three-point mounting arrangement having two sets of the at least one mounting button and the at least one spring arm on one of the top plate or the bottom plate and one set of the at least one mounting button and the at least one spring arm on the other of the top plate or the bottom plate such that one or more optical surfaces of the at least one optical element are preserved against at least one of bending and warping.

34. The system of claim 29, wherein at least one of:
the first end of the at least one spring arm operates to be refracted to clear the at least one optical element for removal or installation into the optical assembly; and
the first end of the at least one spring arm further includes a flex arm hole that operates to permit the first end of the at least one spring arm to be refracted to clear the at least one optical element for removal or installation into the optical assembly.

35. A spring for securing one or more optical elements of an optical assembly, comprising:
a spring arm having a first end and a second end, the first end operating to engage a first face of at least one optical element of an optical assembly and the second end operating to attach to one of either a top plate or a bottom plate of the optical assembly.

36. The spring of claim 35, wherein at least one of:
the first end of the at least one spring arm operates to be refracted to clear the at least one optical element for removal or installation into the optical assembly; and
the first end of the at least one spring arm further includes a flex arm hole that operates to permit the first end of the at least one spring arm to be refracted to clear the at least one optical element for removal or installation into the optical assembly.

37. The spring of claim 35, wherein at least one of:
the spring operates to secure the at least one optical element in between the first end of the spring arm and a mounting button disposed on an opposite side of the at least one optical element;
the at least one optical element is at least one of: a beamsplitter and a compensator plate; and
the at least one optical element extends between the top plate and the bottom plate.

38. The spring of claim 37, wherein the second end of the at least one spring arm further comprises a cylindrical member, the cylindrical member operating to be inserted into, and releasably attached to, one or more securing holes formed within at least one of the top plate and the bottom plate.

39. The spring of claim 38, wherein:
the cylindrical member has a diameter that is at least slightly larger than the one or more securing holes; and
the cylindrical member further comprises a gap extending along a length of the cylindrical member, the gap operating to permit the cylindrical member to compress, thereby reducing the diameter of the cylindrical member, and be inserted into and held in the one or more securing holes by at least one of friction, fusing, and bonding via adhesive.

40. The spring of claim 39, wherein the cylindrical member includes at least one hole extending from an exterior surface of the cylindrical member to an interior surface of the cylindrical member, the at least one hole operating to permit oozing of the adhesive into an interior area of the cylindrical member during curing of the adhesive when bonding or fusing the cylindrical member to the one or more securing holes.

* * * * *

UNITED STATES PATENT AND TRADEMARK OFFICE
CERTIFICATE OF CORRECTION

| | |
|---|---|
| PATENT NO. | : 8,120,853 B2 |
| APPLICATION NO. | : 13/180922 |
| DATED | : February 21, 2012 |
| INVENTOR(S) | : Alexander Jacobson and Zvi Bleier |

It is certified that error appears in the above-identified patent and that said Letters Patent is hereby corrected as shown below:

Claim 34, column 13, line 32: "refracted to clear the at least one optical element for" should be changed to --retracted to clear the at least one optical element for--.

Claim 34, column 13, line 36: "at least one spring arm to be refracted to clear the at least" should be changed to --at least one spring arm to be retracted to clear the at least--.

Claim 36, column 14, line 5: "refracted to clear the at least one optical element for" should be changed to --retracted to clear the at least one optical element for--.

Claim 36, column 14, line 9: "at least one spring arm to be refracted to clear the at least" should be changed to --at least one spring arm to be retracted to clear the at least--.

Signed and Sealed this
Tenth Day of April, 2012

David J. Kappos
*Director of the United States Patent and Trademark Office*